United States Patent [19]

Caster et al.

[11] Patent Number: 5,178,673
[45] Date of Patent: Jan. 12, 1993

[54] INVESTMENT CASTING COMPOSITIONS AND PROCESSES FOR THE MANUFACTURE AND USE THEREOF

[75] Inventors: Sandra A. Caster, Hurricane; Clayton E. Higginbotham, Red House, both of W. Va.

[73] Assignee: Union Carbide Chemicals & Plastics Technology Corporation, Danbury, Conn.

[21] Appl. No.: 684,075

[22] Filed: Apr. 12, 1991

[51] Int. Cl.$^5$ .................. C28B 7/36; C04B 35/68; C04B 28/26

[52] U.S. Cl. .................. 106/38.2; 106/38.22; 106/38.3; 524/445; 524/446; 524/447; 264/221; 264/226; 264/227; 164/36

[58] Field of Search .......... 106/38.2, 38.22, 38.3; 524/445, 446, 447; 264/220, 221, 225, 226, 227; 164/36

[56] References Cited

U.S. PATENT DOCUMENTS

| | | |
|---|---|---|
| 3,465,808 | 9/1969 | Uram ................................ 164/36 |
| 3,857,435 | 12/1974 | Burkert et al. ................... 164/36 |
| 4,108,931 | 8/1978 | Ogden ................................ 264/37 |
| 4,556,528 | 12/1985 | Gersch et al. ................... 264/221 |
| 4,763,715 | 8/1988 | Cannarsa et al. ............... 164/45 |
| 4,773,466 | 9/1988 | Cannarsa .......................... 164/45 |
| 5,084,493 | 1/1992 | Olson et al. ..................... 523/164 |

FOREIGN PATENT DOCUMENTS

| | | |
|---|---|---|
| 9001727 | 2/1990 | PCT Int'l Appl. . |
| 1342599 | 1/1974 | United Kingdom . |
| 2074065 | 10/1981 | United Kingdom . |

Primary Examiner—Nathan M. Nutter
Attorney, Agent, or Firm—R. M. Allen

[57] ABSTRACT

This invention relates to investment casting compositions comprising (i) a refractory material, e.g., a ceramic material, and (ii) a soluble core material comprising one or more block polymers characterized by an ABCBA structure. This invention also relates to methods for investment casting and to the manufacture of molded articles. The soluble core materials exhibit desirable breaking strength, dissolution rate and surface characteristics.

18 Claims, No Drawings

INVESTMENT CASTING COMPOSITIONS AND PROCESSES FOR THE MANUFACTURE AND USE THEREOF

BRIEF SUMMARY OF THE INVENTION

Technical Field

This invention relates to investment casting compositions and to processes for the manufacture and use thereof. More specifically, this invention relates to an investment casting composition comprising (i) a refractory material and (ii) a soluble core material comprising one or more block polymers characterized by an ABCBA structure. The soluble core materials exhibit desirable breaking strength, dissolution rate and surface characteristics.

BACKGROUND OF THE INVENTION

Investment casting is a conventional industrial process which employs a disposable pattern that is used to produce a ceramic mold in which an article or part can be cast. The pattern is conventionally made by injecting a liquid pattern material, e.g., wax, a heat-softenable plastic and the like, into a pattern die. The pattern die is typically manufactured from a durable material, e.g., aluminum, steel and the like, by conventional machining processes. The pattern is removed from the die after the pattern material solidifies.

A refractory material, e.g., an aqueous ceramic slurry, is then built up around the pattern to invest the pattern therein. A mold typically is produced by heating the refractory material having the pattern invested therein to remove the pattern and fuse the refractory material. The details of investment casting process vary depending upon the type of metal to be cast in the mold, the type of core material and the like. The casting of ferrous alloys can be used to illustrate a conventional investment casting process.

The pattern is coated with successive layers of refractory material. Each layer is coated with fine ceramic sand and dried before the next layer is applied. Usually about 10 to 20 layers are utilized to invest the pattern in the refractory material. The invested pattern is then placed in an open ended container which is filled with a coarse slurry of ceramic back-up material which hardens. The container is then placed into a furnace or autoclave. The temperature of the furnace or autoclave is elevated to cause the refractory material to dry and then fuse. The pattern is removed, as by melting or burning out the material constituting the same, during the heating step. The resulting fused ceramic structure is the desired mold.

Removal of the pattern leaves a cavity in the container corresponding in shape and dimension to the final part. The cavity (and therefore the pattern) can be slightly larger than the final part to compensate for the shrinkage which takes place in the subsequent casting operation, or to allow for machining when desired. The mold is sometimes fired to burn out the last traces of pattern material and to fuse the refractory material before the cavity is filled with molten metal. This firing process proceeds slowly in a controlled cycle which can be in a time range of 12 to 18 hours to avoid cracking the mold.

The molten metal is introduced into the cavity of the mold and solidified by cooling to form a casting. After solidification, the mold is broken away to release the part.

U.S. Pat. No. 3,465,808 discloses an investment casting method which involves forming a shell mold using a pattern composed of a mixture of polystyrene and a water soluble ethylene oxide polymer and removing the pattern after formation of the shell mold by treatment with steam under pressure.

U.S. Pat. No. 3,857,435 describes a process of making investment castings using a water decomposable core material that includes a nitrogen containing organo-ring material selected from mono and fused 5 and/or 6 membered ring compounds having as a ring constituent at least one nitrogen atom per every two rings of the compound, water soluble substitution products of said compounds, polymers of said compounds, and polymers of said substitution products of said compounds. It is stated that preferred materials comprise a mixture of these materials with polyethylene glycol and effervescent agents.

United Kingdom Patent 1,342,599 relates to a method of manufacturing an investment casting core by forming, in the shape of an investment casting core, a mixture of a ceramic powder and an organic binder, and heating the shaped core to a temperature insufficient to sinter the ceramic powder but sufficient to remove 48% to 96% by weight of the binder and to carbonize the remainder of the binder thereby to form a non-thermoplastic body of ceramic powder bonded by carbonaceous residues, the binder being so selected as to decompose during said heating to leave a residue of 0.4 to 14% by weight of the total weight of ceramic powder and the carbonaceous residues.

WO Patent Application 90/01727 discloses a method of investment casting that utilizes a pattern produced by stereolithography. The pattern has a polymeric matrix that has intersticial spaces dispersed throughout. The spaces have therein a thermoplastic material that flows from the matrix upon heating during the investment casting process, softening the pattern to prevent the thermal expansion of the pattern from cracking or deforming the mold.

United Kingdom Patent 2,074,065 describes a core for use in investment casting which comprises a ceramic material and a binder such as sodium aluminate which is soluble in water and stable up to such temperatures that the core is refractory above 800° C. Such a core is manufactured by forming the mix of the ceramic material and binder into a granulated semi-dry powder which is then pressed in a die from which it is removed and dried and then fired before use. Alternatively, the ceramic material and binder are mixed with an additional organic binder with the resultant mix being granulated and injected under pressure into a die. After removal from the die, the core is fired to burn out the organic binder. When such cores are used they can be leached out after casting with a hot solution of dilute boric acid or other weak acid which acts to neutralize any sodium hydroxide formed.

U.S. Pat. No. 4,108,931 relates to a system of making molds for investment casting in which the patterns are formed from, and the sprue form is coated with, polyethylene glycol having a molecular weight in the range of from approximately 1,300 to approximately 1,600 or its equivalent and having admixed therein as a filler powdered graphite, in which the graphite comprises in the range of from about 35 percent to 60 percent by weight of the pattern forming material. The patterns are molded to the desired shape, and to include a gate section, and they are adhered to the sprue form in spaced apart relation by fluidizing the gate section end to make a welded connection with the sprue form coating. The mold is then formed about the patterns that are adhered to the sprue form, leaving the pour cup end of the sprue form exposed, to which heat is subsequently applied to sufficiently fluidize the sprue form coating so that the sprue form can be drawn out of the mold thereby leaving the sprue opening. The sprue form coating remaining in the mold sprue and the patterns are then removed without heating the mold by leaching with water, utilizing mechanical and/or chemical agitating after which the mold may be heated sufficiently to dry same for use as an investment casting mold.

U.S. Pat. No. 4,556,528 discloses a method and apparatus for casting of fragile complex shapes by the formation of a two layer wax mold about a pattern of the shape to be cast. Thereafter, the pattern is removed from the mold and the outer layer of wax dissolved. The slip is then poured into the mold and allowed to solidify before the inner layer of the mold is completely removed from the cast article.

U.S. Pat. No. 4,763,715 describes the evaporative casting of molten metals to produce castings having smooth surfaces without any sign of carbon deposits thereon by using a terpolymer polycarbonate prepared from cyclopentene oxide or cyclohexene oxide, ethylene oxide, propylene oxide, or butylene oxide, and carbon dioxide in making patterns for the lost foam casting process.

U.S. Pat. No. 4,773,466 relates to the evaporative casting of molten metals to produce castings having smooth surfaces without any sign of carbon deposits thereon by using a copolymer polycarbonate prepared from cyclohexene oxide, cyclopentene oxide, cycloheptene oxide, or isobutylene oxide and carbon dioxide.

DISCLOSURE OF THE INVENTION

This invention relates in general to an investment casting composition comprising (i) a refractory material, e.g., a ceramic material, and (ii) a soluble core material comprising one or more block polymers characterized by an ABCBA structure.

This invention also relates in general to a method of investment casting comprising (i) investing a three-dimensional pattern in a refractory material to form a shell mold, said pattern comprising one or more block polymers characterized by an ABCBA structure, and (ii) treating the shell mold under conditions sufficient to remove the pattern from said shell mold and fuse the refractory material.

This invention further relates in general to a method of forming an investment mold which comprises (i) forming a composition comprising one or more block polymers characterized by an ABCBA structure, (ii) shaping said composition into a pattern, (iii) investing the pattern in a refractory material to form a shell mold, and (iv) treating the shell mold under conditions sufficient to remove the pattern from said shell mold and fuse the refractory material.

This invention relates in particular to a method of forming an investment mold which comprises:

(i) preparing an alkoxylation product by contacting an organic compound having at least one active hydrogen with an alkylene oxide in the presence of a catalytically effective amount of an alkoxylation catalyst under alkoxylation conditions;

(ii) preparing a mixture of one or more block polymers characterized by an ABCBA structure by contacting said alkoxylation product with an epoxide in the presence of a catalytically effective amount of a catalyst;

(iii) shaping said mixture of one or more block polymers characterized by an ABCBA structure into a pattern;

(iv) investing the pattern in a refractory material to form a shell mold; and (v) treating the shell mold under conditions sufficient to remove the pattern from said shell mold and fuse the refractory material.

This invention also relates in particular to a method of forming a molded article which comprises (i) preparing an alkoxylation product by contacting an organic compound having at least one active hydrogen with an alkylene oxide in the presence of a catalytically effective amount of an alkoxylation catalyst under alkoxylation conditions;

(ii) preparing a mixture of one or more block polymers characterized by an ABCBA structure by contacting said alkoxylation product with an epoxide in the presence of a catalytically effective amount of a catalyst;

(iii) shaping said mixture of one or more block polymers characterized by an ABCBA structure into a pattern;

(iv) investing the pattern in a refractory material to form a shell mold;

(v) treating the shell mold under conditions sufficient to remove the pattern from said shell mold and fuse the refractory material;

(vi) filling said shell mold with a molten metal which is solidified by cooling; and (vii) breaking away the shell mold to release the molded article.

This invention further relates in general to the investment casting materials produced by the above processes of this invention, and to molded articles produced by the processes of this invention.

DETAILED DESCRIPTION

As indicated above, this invention relates in general to an investment casting composition comprising (i) a refractory material, e.g., a ceramic material, and (ii) a soluble core material comprising one or more block polymers characterized by an ABCBA structure.

As also indicated above, this invention relates in general to a method of investment casting comprising (i) investing a three-dimensional pattern in a refractory material to form a shell mold, said pattern comprising one or more block polymers characterized by an ABCBA structure, and (ii) treating the shell mold under conditions sufficient to remove the pattern from said shell mold and fuse the refractory material.

As further indicated above, this invention relates in general to a method of forming an investment mold which comprises (i) forming a composition comprising one or more block polymers characterized by an ABCBA structure, (ii) shaping said composition into a pattern, (iii) investing the pattern in a refractory material to form a shell mold, and (iv) treating the shell mold under conditions sufficient to remove the pattern from said shell mold and fuse the refractory material.

Apart from the one or more block polymers characterized by an ABCBA structure, the components of the investment casting compositions of this invention are generally similar to those used in prior art compositions. Thus, the investment casting compositions of this invention comprise (i) a refractory material, e.g., a ceramic material, and (ii) a soluble core material comprising one or more block polymers characterized by an ABCBA structure.

An investment casting composition of this invention may comprise, on a solids basis, from about 1 to about 90 percent by weight or greater of refractory material and from about 1 to about 90 percent by weight or greater of the one or more block polymers characterized by an ABCBA structure.

This invention extends to the above described investment casting compositions in all physical forms, and in particular to such compositions in the form of molds. As already noted, it is one of the important advantages of the investment casting compositions of this invention that the soluble core materials exhibit desirable breaking strength, dissolution rate and surface characteristics.

Suitable refractory materials useful in this invention include, for example, aqueous ceramic slurries.

The investment casting compositions of this invention are comprised of soluble core material comprising one or more block polymers or copolymers characterized by an ABCBA structure. In particular, the block polymers characterized by an ABCBA structure are comprised of:

(1) A blocks or segments which can be represented as follows:

$$[R_{20}-]$$

wherein $R_{20}$ is the same or different and is an organic residue of an organic compound having at least one active hydrogen; and wherein the A blocks represent in general from about 1 weight percent or less to about 40 weight percent or greater of the weight of the ABCBA polymer;

(2) B blocks or segments which can be represented as follows:

$$[-CHR_{21}-CHR_{22}O-]_m$$

wherein $R_{21}$ and $R_{22}$ are the same or different and are hydrogen or alkyl (including hydroxy- and halo-substituted alkyl) of, for example, 1 to 28 carbons and m is an integer of at least 1, say, 1 to about 200 or greater; and wherein the B blocks represent in general from about 10 weight percent or less to about 95 weight percent or greater of the weight of the ABCBA polymer; and (3) a C block or segment which can be represented as follows:

$$[-R_{23}-]$$

wherein $R_{23}$ is an organic residue of an epoxide containing two or more epoxy groups; and wherein the C block represents in general from about 1 to about 20 weight percent or greater of the weight of the ABCBA polymer.

Each terminal oxy moiety, i.e., —O—, of the B block is individually connected to the terminal alkylene moiety, i.e., —CH$_2$—, of the C block through a monovalent bond to form an oxyalkylene group, i.e., —OCH$_2$—. Each terminal alkylene moiety, i.e., —CHR$_{21}$—, of the B block is individually connected to the terminal oxy moiety, i.e., —O—, of the A block through a monovalent bond to form an oxyalkylene group, i.e., —OCHR$_{21}$—. It is appreciated that unreacted and/or partially reacted precursors to various blocks or segments or mixtures thereof may be present in the product mixture.

The block polymers characterized by an ABCBA structure which are useful in this invention have an average molecular weight of from about 500 to about 20,000, preferably from about 1,500 to about 8,500. For purposes of this invention, the average molecular weight should be sufficient to provide solid block polymers characterized by an ABCBA structure at room temperature.

The A blocks or segments can be the same or different and represent an organic residue of an organic compound having at least one active hydrogen. Suitable organic compounds having active hydrogens include alcohols (mono-, di- and polyhydric alcohols), phenols, carboxylic acids (mono-, di- and polyacids), and amines (primary and secondary). The organic compounds may contain 1 carbon to about 100 or 150 carbons (in the case of polyol polymers) and may contain aliphatic and/or aromatic structures. Most often, the organic compounds are dihydric alcohols having 1 to about 30 carbon atoms. The organic compounds having active hydrogens can be the products of hydroformylation/hydrogenation reactions.

In those instances where the A blocks or segments represent an organic residue of an organic compound having 2 or more active hydrogens, e.g., di- and polyhydric alcohols, the block polymers characterized by an ABCBA structure can be at least partially crosslinked. However, for purposes of this invention, it is desirable that the degree of crosslinking does not exceed that which would lead to a suitable low viscosity product in the molten state.

Suitable alcohols are primary and secondary monohydric alcohols which are straight or branched chain such as methanol, ethanol, propanol, pentanol, hexanol, heptanol, octanol, nonanol, decanol, undecanol, dodecanol, tridecanol, tetradecanol, pentadecanol, hexadecanol, octadecanol, isopropyl alcohol, 2-ethylhexanol, sec-butanol, isobutanol, 2-pentanol, 3-pentanol and isodecanol. Suitable alcohols are linear and branched primary alcohols (including mixtures) such as produced by the Ziegler oligomerization/oxidation process and the "Oxo" reaction of C$_3$ to C$_{20}$ olefins. The alcohols may also be cycloaliphatic such as cyclopentanol, cyclohexanol, cycloheptanol, cyclooctanol, as well as aromatic substituted aliphatic alcohols such as benzyl alcohol, phenylethyl alcohol and phenylpropyl alcohol. Other aliphatic structures include 2-methoxyethanol and the like. Halo-substituted alcohols and silicon-containing organic compounds having at least one active hydrogen may also be useful in this invention.

Phenols include alkylphenols of up to 30 carbons such a p-methylphenol, p-ethylphenol, p-butylphenol, p-heptylphenol, p-nonylphenol, dinonylphenol and p-decylphenol. The aromatic radicals may contain other substituents such as halide atoms.

Particularly preferred alcohols (polyols) having 2 or more hydroxyl groups, e.g., about 2 to 6 hydroxyl groups and have 2 to 30 carbons, include glycols such as ethylene glycol, propylene glycol, butylene glycol, pentylene glycol, hexylene glycol, neopentylene glycol, decylene glycol, diethylene glycol, triethylene glycol and dipropylene glycol. Other polyols include glycerine, 1,3-propanediol, pentaerythritol, galactitol, sorbitol, mannitol, erythritol, trimethylolethane and trimethylolpropane.

The B blocks or segments can be the same or different and represent oxyalkylene units. The alkylene oxides which provide the oxyalkylene units in the alkoxylated products include alkylene oxides such as ethylene oxide, propylene oxide, 1,2-butylene oxide, 2,3-butylene oxide, 1,2- and 2,3-pentylene oxide, cyclohexylene oxide, 1,2-hexylene oxide, 1,2-octylene oxide, and 1,2-decylene oxide; epoxidized fatty alcohols such as epoxidized soybean fatty alcohols and epoxidized linseed fatty alcohols; aromatic epoxides such as styrene oxide and 2-ethylstyrene oxide; and hydroxy-and halogen-substituted alkylene oxides such as glycidol, epichlorhydrin and epibromhydrin. The preferred alkylene oxides are ethylene oxide, propylene oxide or mixtures thereof. For purposes of this invention, the block polymers characterized by an ABCBA structure contain sufficient ethylene oxide to impart water solubility thereto.

The selection of the organic residue of an organic compound having at least one active hydrogen and the oxyalkylene moieties is based on the particular properties desired in the resulting alkoxylation product. Advantageously, narrow distributions of alkoxylate species may be obtained using a wide variety of compounds having active hydrogens, especially dihydric alcohols, which may provide desirable alkoxylation products for use in the manufacture of investment casting compositions. Because of the narrow alkoxylate species distribution of the alkoxylation product, these especially attractive alkoxylation products may provide a highly desirable balance of performance properties in investment casting compositions. Hence, the organic compound often comprises a dihydric alcohol of about 1 to 30 carbons and the alkylene oxide comprises ethylene oxide.

The C block or segment represents an organic residue of an epoxide containing two or more epoxy groups. The epoxy groups can be terminal epoxy groups or internal epoxy groups. Illustrative epoxides include glycidyl type epoxides, cyloaliphatic epoxides, aliphatic epoxides, epoxy cresol novolac resins, epoxy phenol novolac resins, polynuclear phenol-glycidyl ether-derived resins, aromatic and heterocyclic glycidyl amine resins, hydantoin epoxy resins, and the like, and mixtures thereof. The selection of the epoxide is based on the particular properties desired in the resulting mixture of block polymers characterized by an ABCBA structure. Monomers and oligomers of diepoxides are preferred for use in this invention. Also, hindered diepoxides are preferred for use in this invention since unhindered diepoxides may lead to unsuitable high viscosity products in the molten state.

The glycidyl-type epoxides are preferably diglycidyl ethers of bisphenol A which are derived from bisphenol A and epichlorohydrin and have the following formula:

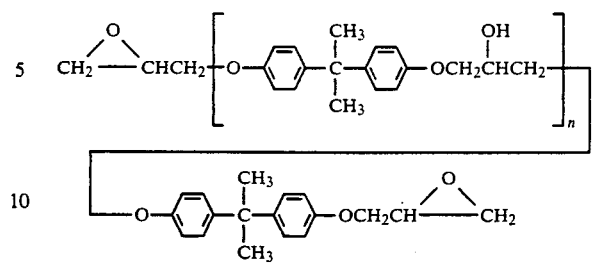

wherein n is an integer of from 0 to about 20 or greater, preferably n is an interger of from 0 to about 3.

Suitable cycloaliphatic epoxides for purposes of this invention are those having an average of two or more epoxy groups per molecule. Illustrative of suitable cycloaliphatic epoxides are the following:

FORMULA I

Diepoxides of cycloaliphatic esters of dicarboxylic acids having the formula:

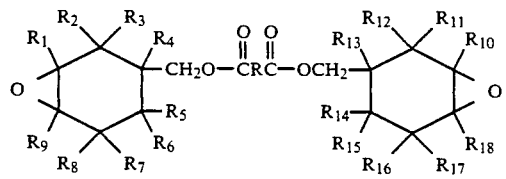

wherein $R_1$ through $R_{18}$ are the same or different and are hydrogen or alkyl radicals generally containing 1 to 9 carbon atoms inclusive, preferably containing 1 to 3 carbon atoms inclusive, as for example, methyl, ethyl, n-propyl, n-butyl, n-hexyl, 2-ethylhexyl, n-octyl, n-nonyl and the like; R is a valance bond or a divalent hydrocarbon radical generally containing 1 to 20 carbon atoms inclusive, preferably containing 4 to 6 carbon atoms inclusive, as for example, alkylene radicals such as trimethylene, tetramethylene, pentamethylene, hexamethylene, 2-ethylhexamethylene, octamethylene, nonamethylene, hexadecamethylene and the like, and cycloaliphatic radicals such as 1,4-cyclohexane, 1,3-cyclohexane, 1,2-cyclohexane and the like.

Suitable epoxides falling within the scope of Formula I are those wherein $R_1$ through $R_{18}$ are hydrogen and R is alkylene containing 4 to 6 carbon atoms. Among specific diepoxides of cycloaliphatic esters of dicarboxylic acids are the following: bis(3,4-epoxycyclohexylmethyl)oxalate; bis(3,-4-epoxycyclohexylmethyl)adipate; bis(3,4-epoxy-6-methylcyclohexylmethyl)adipate; bis(3,4-epoxycyclohexylmethyl)pimelate; and the like. Other suitable compounds are described, for example, in U.S. Pat. No. 2,750,395.

FORMULA II 3,4-Epoxycyclohexylmethyl-3,4-epoxycyclohexane carboxylates having the formula:

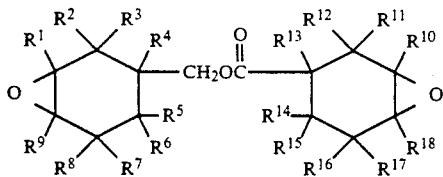

wherein $R^1$ through $R^{18}$ are as defined for $R_1$ to $R_{18}$ in Formula I. Particularly desirable compounds are those wherein $R^1$ through $R^{18}$ are hydrogen.

Among specific compounds falling within the scope of Formula II are the following: 3,4-epoxycyclohexylmethyl-3,4-epoxycyclohexane carboxylate; 3,4-epoxy-1-methylcyclohexylmethyl-3,4-epoxy-1-methylcyclohexane carboxylate; 6-methyl-3,4-epoxycyclohexylmethyl-6-methyl-3,4-epoxycyclohexane carboxylate; 3,4-epoxy-3-methylcyclohexylmethyl-3,4-epoxy-3-methylcyclohexane carboxylate; and 3,4-epoxy-5-methylcyclohexylmethyl-3,4-epoxy-5-methylcyclohexane carboxylate. Other suitable compounds are described, for example, in U.S. Pat. No. 2,890,194.

FORMULA III

Diepoxides having the formula:

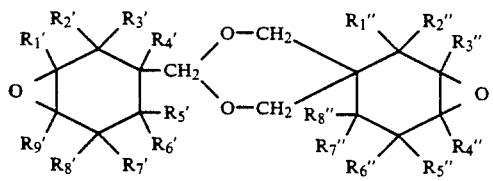

wherein the R single and double primes, which can be the same or different are monovalent substituents such as hydrogen, halogen, i.e, chlorine, bromine, iodine or fluorine, or monovalent hydrocarbon radicals or radicals as further defined in U.S. Pat. No. 3,318,822. Suitable compounds are those wherein all the R single and double primes are hydrogen.

Other suitable cycloaliphatic epoxides are the following:

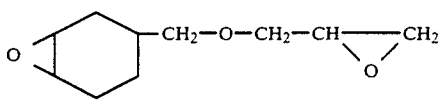

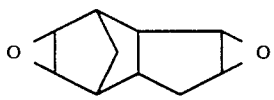

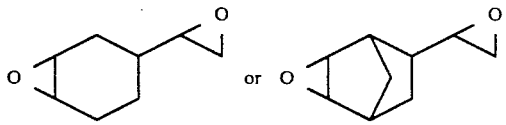

and the like.

Other suitable cycloaliphatic epoxides are the following:

3,4-epoxycyclohexylmethyl-3,4-epoxycyclohexane carboxylate

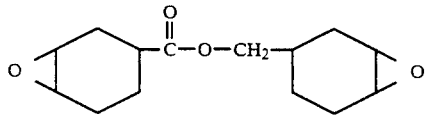

bis(3,4-epoxycyclohexylmethyl)adipate

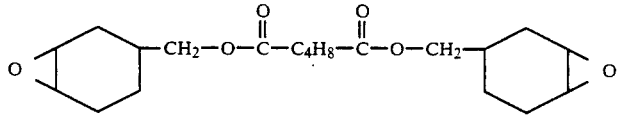

2-(3,4-epoxycyclohexyl-5,5-spiro-3,4-epoxy)cyclohexane-meta-dioxane

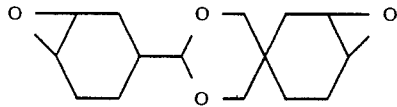

or mixtures thereof.

Epoxides with six membered ring structures may also be used, such as diglycidyl esters of phthalic acid, partially hydrogenated phthalic acid or fully hydrogenated phthalic acid. A representative diglycidyl ester of phthalic acid is the following:

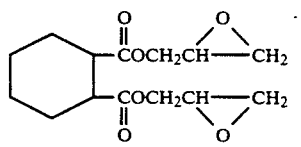

Diglycidyl esters of hexahydrophthalic acids are suitable for use in this invention.

The epoxy cresol novolac resins are multifunctional, solid polymers characterized by low ionic and hydrolyzable chlorine impurities, high chemical resistance, and thermal performance.

The epoxy phenol novolac resins are generally of the following formula:

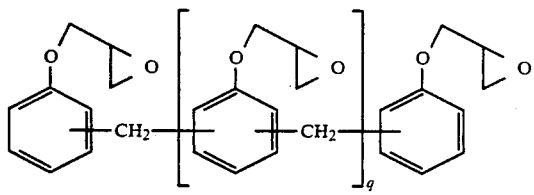

wherein q is an integer of from 0 to about 20 or greater, preferably q is an integer of from 0 to about 3.

The polynuclear phenol-glycidyl ether-derived resins are generally of the formula:

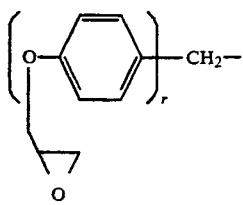

wherein r is an integer of 2.

Among the aromatic and heterocyclic glycidyl amine resins which may be included herein are the following: tetraglycidylmethylenedianiline derived resins of the following formula:

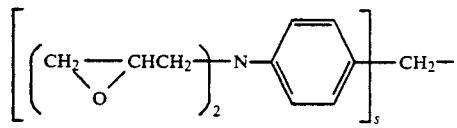

wherein s is an integer of 2; triglycidyl-p-aminophenol derived resins, triazine based resins and hydantoin epoxy resins of the formula:

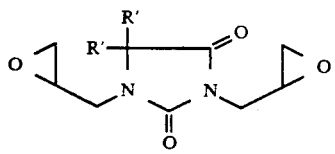

wherein R' is methyl; and heterocyclic diglycidyl amine resins of the formula:

In a preferred embodiment, the organic diepoxy compounds suitable for use in this invention are those composed of carbon, hydrogen and oxygen atoms, the oxygen being present in the form of oxirane and, optionally, ether and/or ester arrangements. The preferred diepoxy compounds include, for example, the bis(epoxyalkyl)cycloalkanes; the bis(epoxycycloalkyl)ethers, e.g, bis(2,3-epoxycyclopentyl)ether; the bis(epoxyalkoxy)benzenes, e.g., the bis(2,3-epoxypropoxy)benzenes; the bis(epoxyalkoxyphenyl)alkanes, e.g., the diglycidyl ether of 2,2-bis(4-hydroxyphenyl)propane; 3,4-epoxycyclohexylmethyl 3,4-epoxycyclohexanecarboxylate; 4-vinylcyclohexene diepoxide; and the like. The di(epoxyalkyl)-diethers of dihydric phenols wherein the epoxyalkyl moiety contains from 2 to 20 carbon atoms are most preferred, especially the diglycidyl diether of 2,2-bis(4-hydroxyphenyl)propane, of hydroquinone, of biphenol, and the like. By the term "dihydric phenol" as used herein is meant that each of the two phenolic hydroxyl groups (—OH) is directly bonded to the same or different benzenoid nucleus.

The block polymers characterized by an ABCBA structure can comprise from about 1 to about 90 weight percent or greater of the total weight of the investment casting composition. The amount of block polymers characterized by an ABCBA structure employed in the investment casting compositions of this invention can vary widely depending on the particular properties desired in the investment casting compositions. The amount of block polymers characterized by an ABCBA structure employed in the investment casting compositions of this invention should be sufficient to impart to the soluble core materials desirable breaking strength, dissolution rate and surface characteristics.

As indicated above, this invention relates to method of forming an investment mold which comprises:

(i) preparing an alkoxylation product by contacting an organic compound having at least one active hydrogen with an alkylene oxide in the presence of a catalytically effective amount of an alkoxylation catalyst under alkoxylation conditions;

(ii) preparing a mixture of one or more block polymers characterized by an ABCBA structure by contacting said alkoxylation product with an epoxide in the presence of a catalytically effective amount of a catalyst;

(iii) shaping said mixture of one or more block polymers characterized by an ABCBA structure into a pattern;

(iv) investing the pattern in a refractory material to form a shell mold; and (v) treating the shell mold under conditions sufficient to remove the pattern from said shell mold and fuse the refractory material.

The alkoxylation products prepared in step (i) above comprise alkoxylation species that can be represented by the formula:

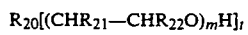

$R_{20}[(CHR_{21}—CHR_{22}O)_mH]_t$ wherein $R_{20}$ is an organic residue of an organic compound having at least one active hydrogen as described above, t is an integer of at least 1 up to the number of active hydrogens contained by the organic compound, $R_{21}$ and $R_{22}$ may be the same or different and can be hydrogen and alkyl (including hydroxy- and halo-substituted alkyl) of, for example, 1 to 28 carbons as described above, and m is an integer of at least 1, say, 1 to about 60 as described above.

The alkoxylation is conducted using a catalytically effective amount of an alkoxylation catalyst, e.g., about 0.001 to 10, often about 0.5 to 5, weight percent based on the weight of the starter component. The starter component is the organic compound having at least one active hydrogen with which the alkylene oxide reacts. The alkoxylation catalysts substantially retain their activities during the alkoxylation, regardless of the amount of alkylene oxide employed. Thus, the amount of alkoxylation catalyst can be based on the amount of starter provided to the alkoxylation zone and not the degree of alkoxylation to be effected.

A wide variety of alkoxylation catalysts are suitable for use in the process of this invention. The catalyst of choice will depend on whether an alkoxylation product having a narrow distribution or conventional distribution of alkoxylate species is desired. In a preferred embodiment for obtaining alkoxylation products having a narrow distribution of alkoxylate species, suitable alkoxylation catalysts include, for example, calcium-containing catalysts using calcium oxide or calcium hydroxide as sources of the catalytically active calcium, calcium-containing catalysts modified with a divalent or polyvalent oxyacid or metal salt of an oxyacid, calcium sulfate, modified calcium-containing bimetallic or polymetallic catalysts, organic polymer-supported calcium-containing catalysts, modified Group IIIB metal-containing bimetallic or polymetallic catalysts, modified Group IIA metal-containing bimetallic or polymetallic catalysts and other modified bimetallic and polymetallic catalysts described below. Preferred modifiers for the above alkoxylation catalysts include, for example, divalent or polyvalent oxyacids and divalent or polyvalent metal salts of oxyacids. In an embodiment for obtaining alkoxylation products having a conventional distribution of alkoxylate species, suitable alkoxylation catalysts include, for example, sodium hydroxide, potassium hydroxide and the like.

Normally, the alkoxylation catalyst and the starter component are admixed and then the alkylene oxide is added at the reaction temperature until the desired amount of alkylene oxide has been added, then the product is neutralized and can be finished, if desired, in any procedure including stripping unreacted starter material from the product mixture, filtration or further reaction.

The temperature of the alkoxylation is sufficient to provide a suitable rate of reaction and without degradation of the reactants or reaction products. Often, the temperatures range from between about 50° C. and 270° C., e.g., from about 100° C. to 200° C. The pressure may also vary widely, but when low-boiling alkylene oxides such as ethylene oxide and propylene oxide are employed, a pressurized reactor is preferably used.

The alkoxylation reaction medium is preferably agitated to ensure a good dispersal of the reactants and catalyst throughout the reaction medium. Also, the alkylene oxide is usually added at a rate approximating that at which it can be reacted.

Neutralization may assist in the recovery of the catalyst from the alkoxylation product. When neutralizing, acids that may tend to form catalyst-containing gel structures or solids that clog filtering apparatus should be avoided. Conveniently, sulfuric acid, phosphoric acid, propionic acid, benzoic acid and the like are used.

Alkoxylation products useful in this invention and processes for the preparation thereof are generally known in the art. Illustrative processes for preparing alkoxylation products including suitable alkoxylation catalysts which can be useful in this invention are described, for example, in U.S. Pat. No. 4,754,075, U.S. Pat. No. 4,886,917, U.S. Pat. No. 4,820,673, U.S. patent application Ser. No. 251,434, filed Sep. 30, 1988, U.S. patent application Ser. No. 251,430, filed Sep. 30, 1988, U.S. patent application Ser. No. 251,433, filed Sep. 30, 1988, U.S. patent application Ser. No. 251,432, filed Sep. 30, 1988, U.S. patent application Ser. No. 251,436, filed Sep. 30, 1988, U.S. patent application Ser. No. 251,431, filed Sep. 30, 1988, U.S. patent application Ser. No. 102,939, filed Sep. 30, 1987, U.S. Pat. No. 4,453,023 and U.S. Pat. No. 4,453,022, all incorporated herein by reference.

While certain alkoxylation processes described above are capable of selectively providing narrow distributions of alkoxylates with the most prevalent having as low as one mole of oxyalkylene per mole of active hydrogen site, an advantage can exist in the ability to provide a narrow distribution at higher levels of alkoxylation. For some investment casting compositions, a relatively few alkoxylate species may provide the desired performance properties.

In accordance with step (ii) of the process of this invention, the alkoxylation product is reacted with an epoxide in the presence of a catalytically effective amount of a catalyst to produce a mixture of block polymers characterized by an ABCBA structure. The block polymers characterized by an ABCBA structure are described hereinabove.

The reaction of the alkoxylation product with an epoxide is conducted using a catalytically effective amount of a catalyst, e.g., about 0.01 to about 5, often about 0.1 to about 2, weight percent based on the weight the reactants. Suitable catalysts include any of the conventional ring-opening catalysts known in the art. Illustrative of such catalysts include, for example, potassium hydroxide, sodium hydroxide, stannous dioctanoate, cationic or protonic acid catalysts and the like.

Suitable cationic or protonic acid catalysts for use in step (ii) of the process of this invention include, for example, triflic acid, triflic acid salts, boron trifluoride etherate, boron trifluoride, methane sulfonic acid and the like. Particularly well suited catalysts are the triflic acid salts because of the high quality color (i.e., low color) characteristics of these compounds, the shelf-life characteristics of these compounds, and the wide variety of compounds that can be prepared which allows altering reaction conditions. Illustrative of these salts are diethylammonium triflate which is available as a solution from 3M Company as FC-520, triethylammonium triflate, ammonium triflate, diisopropylammonium triflate, ethyl diisopropylammonium triflate and the like.

Normally, the catalyst and the alkoxylation product are admixed and then the epoxide is added at the reaction temperature until the desired amount of epoxide has been added, then the resulting product is neutralized and can be finished, if desired, in any procedure including filtration or further reaction.

The molar concentration ratio of alkoxylation product to epoxide in step (ii) of the process of this invention can range from about 1.5:1 to about 8:1 or higher. Higher or lower molar ratios than stoichiometric, i.e., 2:1, give block polymer products with unreacted starting materials which can affect the properties of the block polymer products.

Mixtures or blends of block polymers characterized by an ABCBA structure with unreacted or other alkoxylation products may be desirable for use in this invention. The amount of alkoxylation product employed in combination with the block polymers characterized by an ABCBA structure can vary over a wide range, e.g., from about 1 to about 95 weight percent or greater, depending on the particular properties desired in the investment casting compositions. The amount of alkoxylation product employed in combination with the block polymers characterized by an ABCBA structure should be sufficient to impart to the mold desirable breaking strength and surface characteristics. One or more alkoxylation products in combination with one or more block polymers characterized by an ABCBA structure can be suitably employed in the investment casting compositions of this invention. This invention is not to be construed as being limited in regard to the amounts of block polymers characterized by an ABCBA structure and unreacted or other alkoxylation products in mixtures or blends thereof.

The temperature of the step (ii) reaction is sufficient to provide a suitable rate of reaction without degradation of the reactants or reaction products. Often, the temperatures range from between about 50° C. and 250° C., e.g., from about 100° C. to 175° C. The pressure may also vary widely, but when low-boiling epoxides are employed, a pressurized reactor is preferably used.

The step (ii) reaction medium can be agitated to ensure a good dispersal of the reactants and catalyst throughout the reaction medium. Also, the epoxide is usually added at a rate approximating that at which it can be reacted.

Neutralization may assist in the recovery of the catalyst from the block polymer product mixture. When neutralizing, acids that may tend to form catalyst-containing gel structures or solids that clog filtering apparatus should be avoided. Conveniently, sulfuric acid, phosphoric acid, propionic acid, benzoic acid and the like are used.

Steps (iii), (iv) and (v) of the processes of this invention can be conducted by conventional methods known in the art. See, for example, U.S. Pat. No. 3,465,808, United Kingdom Patent 2,074,065 and U.S. Pat. No. 4,108,931.

As indicated above, this invention relates to a process for producing a molded article which comprises:

(i) preparing an alkoxylation product by contacting an organic compound having at least one active hydrogen with an alkylene oxide in the presence of a catalytically effective amount of an alkoxylation catalyst under alkoxylation conditions;

(ii) preparing a mixture of one or more block polymers characterized by an ABCBA structure by contacting said alkoxylation product with an epoxide in the presence of a catalytically effective amount of a catalyst;

(iii) shaping said mixture of one or more block polymers characterized by an ABCBA structure into a pattern;

(iv) investing the pattern in a refractory material to form a shell mold;

(v) treating the shell mold under conditions sufficient to remove the pattern from said shell mold and fuse the refractory material;

(vi) filling said shell mold with a molten metal which is solidified by cooling; and (vii) breaking away the shell mold to release the molded article.

Steps (i)-(v) have been discussed hereinabove. Steps (vi) and (vii) can also be accomplished by conventional procedures well known in the art.

The following examples are now given, though by way of illustration only, to show details of particularly preferred components, compositions, and techniques used in the composition and processes of the invention. The CARBOWAX ® polyethylene glycol compounds employed in the following examples are available from Union Carbide Chemcials and Plastics Company Inc., Danbury, Connecticut. The linked CARBOWAX ® polyethylene glycol compounds employed in the following examples were prepared using EPON ® 828 (a diglycidyl ether of Bisphenol A) as the linker. Also, in the following examples, the molar concentration ratio of alkoxylation product to epoxide was 2:1 for CARBOWAX ® polyethylene glycol compounds PEG 1000, PEG 1450 and PEG 3350 and 4:1 for CARBOWAX ® polyethylene glycol compound PEG 8000.

EXAMPLES 1-9

Various CARBOWAX ® polyethylene glycol compounds identified in Table A were molded into rods (0.5 inches diameter x 5 inches in length) under vacuum to yield air bubble-free specimens. The rods were tested for breaking strength in accordance with ASTM D4476-85 (Standard Test Method for Flexural Properties of Fiber Reinforced Pultruded Plastic Rods). The results are given in Table A.

TABLE A

| Example | CARBOWAX ® Polyethylene Glycol Compound | Breaking Strength (grams) |
|---|---|---|
| 1 | PEG 1000 (Unlinked) | 2230 |
|   | PEG 1000 (Linked) | 8670 |
| 2 | PEG 1000 (Unlinked) | 2240 |
|   | PEG 1000 (Linked) | 8010 |
| 3 | PEG 1450 (Unlinked) | 10130 |
|   | PEG 1450 (Linked) | 16420 |
| 4 | PEG 1450 (Unlinked) | 11200 |
|   | PEG 1450 (Linked) | 17160 |
| 5 | PEG 3350 (Unlinked) | 5760 |
|   | PEG 3350 (Linked) | — |
| 6 | PEG 3350 (Unlinked) | — |
|   | PEG 3350 (Linked) | — |
| 7 | PEG 8000 (Unlinked) | 10170 |
|   | PEG 8000 (Linked) | 20080 |
| 8 | PEG 8000 (Unlinked) | 9230 |
|   | PEG 8000 (Linked) | 20070 |
| 9 | PEG 8000 (Linked) | 20075 |

EXAMPLES 10-14

One gram samples of various CARBOWAX ® polyethylene glycol compounds identified in Table B were dissolved in 300 grams of water at ambient temperature with vigorous stirring to evaluate dissolution rates thereof. The results are given in Table B.

TABLE B

| Example | CARBOWAX ® Polyethylene Glycol Compound | Dissolution Rate (minutes/gram) |
|---|---|---|
| 10 | PEG 1000 (Unlinked) | 15 |
|    | PEG 1000 (Linked) | 33 |
| 11 | PEG 1450 (Unlinked) | 17 |
|    | PEG 1450 (Linked) | 53 |
| 12 | PEG 3350 (Unlinked) | 25 |
|    | PEG 3350 (Linked) | 53 |
| 13 | PEG 8000 (Unlinked) | 36 |
| 14 | PEG 8000 (Linked) | 75 |

EXAMPLES 15-22

A 75% relative humidity chamber and a 52% relative humidity chamber were established in glass dessicators to evaluate hygroscopicity of various CARBOWAX ® polyethylene glycol compounds identified in Table C. The 75% relative humidity chamber contained several inches of aqueous sodium chloride and the 52% relative humidity chamber contained several inches of aqueous magnesium nitrate. One gram samples of each CARBOWAX ® polyethylene glycol compound were melted, poured into glass dishes and placed inside the humidity chambers. The sample weights were measured daily and, at the end of 8 days, all of the samples had reached equilibrium (percent weight gain). The results are given in Table C.

TABLE C

| Example | CARBOWAX ® Polyethylene Glycol Compound | Hygroscopicity (% wt. gain) | Relative Humidity (%) |
|---|---|---|---|
| 15 | PEG 1000 (Unlinked) | 4.8 | 52 |
|    | PEG 1000 (Linked) | 4.1 | 52 |
| 16 | PEG 1000 (Unlinked) | 33.0 | 75 |
|    | PEG 1000 (Linked) | 19.9 | 75 |
| 17 | PEG 1450 (Unlinked) | 1.4 | 52 |
|    | PEG 1450 (Linked) | 1.3 | 52 |
| 18 | PEG 1450 (Unlinked) | 16.8 | 75 |
|    | PEG 1450 (Linked) | 5.2 | 75 |
| 19 | PEG 3350 (Unlinked) | 0.6 | 52 |
|    | PEG 3350 (Linked) | 0.3 | 52 |
| 20 | PEG 3350 (Unlinked) | 2.3 | 75 |
|    | PEG 3350 (Linked) | 2.4 | 75 |
| 21 | PEG 8000 (Unlinked) | 0.1 | 52 |
|    | PEG 8000 (Linked) | 0.3 | 52 |
| 22 | PEG 8000 (Unlinked) | 1.5 | 75 |
|    | PEG 8000 (Linked) | 1.9 | 75 |

EXAMPLES 23-27

Molded samples of various CARBOWAX® polyethylene glycol compounds identified in Table D were visually examined to evaluate their surface characteristics. The results are given in Table D.

TABLE D

| Example | CARBOWAX ® Polyethylene Glycol Compound | Surface Appearance |
|---|---|---|
| 23 | PEG 1000 (Unlinked) | Some surface cracking. |
|    | PEG 1000 (Linked) | Smooth |
| 24 | PEG 1450 (Unlinked) | Some surface cracking. |
|    | PEG 1450 (Linked) | Smooth |
| 25 | PEG 3350 (Unlinked) | Some surface cracking; macrospherolytes. |
|    | PEG 3350 (Linked) | Smooth |
| 26 | PEG 8000 (Unlinked) | Some surface cracking; macrospherolytes. |
|    | PEG 8000 (Linked) | Smooth |
| 28 | PEG 8000 (Linked) | Smooth |

Although the invention has been illustrated by the preceding examples, it is not to be construed as being limited thereby; but rather, the invention encompasses the generic area as hereinbefore disclosed. Various modifications and embodiments can be made without departing from the spirit and scope thereof.

We claim:

1. An investment casting composition comprising (i) a refractory material and (ii) a soluble core material comprising one or more block polymers characterized by an ABCBA structure wherein:

(1) A blocks or segments can be represented as follows:

$[R_{20}-]$ wherein $R_{20}$ is the same or different and is an organic residue of an organic compound having at least one active hydrogen;

(2) B blocks or segments can be represented as follows:

$[-CHR_{21}-CHR_{22}O-]_m$ wherein $R_{21}$ and $R_{22}$ are the same or different and are hydrogen, alkyl, hydroxy-substituted alkyl, or halo-substituted alkyl, and m is an integer of 1 or greater; and (3) C blocks or segments can be represented as follows:

$[-R_{23}-]$ wherein $R_{23}$ is an organic residue of an epoxide containing two or more epoxy groups.

2. The investment casting composition of claim 1 comprising, on a solids basis, from about 1 to about 90 percent by weight or greater of the refractory material, and from about 1 to about 90 percent by weight or greater of the one or more block polymers characterized by an ABCBA structure.

3. The investment casting composition of claim 1 wherein the refractory material comprises an aqueous ceramic slurry.

4. The investment casting composition of claim 1 wherein the refractory material comprises clay.

5. The investment casting composition of claim 1 wherein the one or more block polymers characterized by an ABCBA structure have an average molecular weight of from about 500 to about 20,000.

6. The investment casting composition of claim 1 wherein the one or more block polymers characterized by an ABCBA structure have an average molecular weight of from about 1,500 to about 8,500.

7. The investment casting composition of claim 1 wherein $R_{20}$ is an organic residue of an alcohol.

8. The investment casting composition of claim 7 wherein the alcohol comprises a dihydric, aliphatic alcohol having from 1 to about 30 carbon atoms.

9. The investment casting composition of claim 7 wherein the alcohol is selected from ethylene glycol, diethylene glycol, nonylphenol, n-dodecanol, a mixture of $C_8$–$C_{10}$ alcohols, a mixture of $C_{11}$–$C_{15}$ alcohols or a mixture of $C_{12}$ and $C_{14}$ alcohols.

10. The investment casting composition of claim 7 wherein the alcohol is ethylene glycol, diethylene glycol or a mixture of $C_{12}$ and $C_{14}$ alcohols.

11. The investment casting composition of claim 1 wherein $R_{21}$ and $R_{22}$ are hydrogen and m is an integer of from 1 to about 200.

12. The investment casting composition of claim 1 wherein the epoxide is selected from bis(epoxyalkyl)cycloalkanes, bis(epoxycycloalkyl)ethers, bis(epoxyalkoxy)benzenes and bis(epoxyalkoxyphenyl)alkanes.

13. The investment casting composition of claim 1 wherein the epoxide comprises a di(epoxyalkyl)diether of a dihydric phenol.

14. The investment casting composition of claim 1 wherein the epoxide comprises the diglycidyl diether of 2,2-bis(4-hydroxyphenyl)propane.

15. The investment casting composition of claim 1 having a viscosity of from about 100 to about 10,000 centipoise at a temperature of 25° C.

16. The investment casting composition of claim 1 wherein the one or more block polymers characterized by an ABCBA structure comprise from about 1 to about 90 weight percent or greater of the total weight of the investment casting composition.

17. The investment casting composition of claim 1 further comprising one or more alkoxylation products.

18. The investment casting composition of claim 17 wherein the one or more alkoxylation products comprise from about 1 to about 90 weight percent or greater of the total weight of the investment casting composition.

* * * * *